US009760260B2

(12) United States Patent
Boguraev et al.

(10) Patent No.: US 9,760,260 B2
(45) Date of Patent: Sep. 12, 2017

(54) SYSTEM FOR RETRIEVING, VISUALIZING AND EDITING SEMANTIC ANNOTATIONS

(71) Applicant: International Business Machines Corporation, Armonk, NY (US)

(72) Inventors: Branimir K. Boguraev, Bedford, NY (US); Anthony T. Levas, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 14/550,010

(22) Filed: Nov. 21, 2014

(65) Prior Publication Data
US 2016/0147840 A1    May 26, 2016

(51) Int. Cl.
| | |
|---|---|
| G06F 17/30 | (2006.01) |
| G06F 3/0484 | (2013.01) |
| G06F 17/22 | (2006.01) |
| G06F 17/24 | (2006.01) |

(52) U.S. Cl.
CPC ........ *G06F 3/0484* (2013.01); *G06F 17/2247* (2013.01); *G06F 17/241* (2013.01); *G06F 17/30312* (2013.01)

(58) Field of Classification Search
None
See application file for complete search history.

(56) References Cited

U.S. PATENT DOCUMENTS

| | | | | | |
|---|---|---|---|---|---|
| 5,404,295 | A | * | 4/1995 | Katz | G06F 17/241 704/9 |
| 6,519,603 | B1 | * | 2/2003 | Bays | G06F 17/241 |
| 7,941,444 | B2 | * | 5/2011 | Cragun | G06F 17/30873 707/784 |
| 8,265,925 | B2 | * | 9/2012 | Aarskog | G06F 17/271 704/1 |
| 8,442,940 | B1 | * | 5/2013 | Faletti | G06F 17/2785 704/9 |

(Continued)

OTHER PUBLICATIONS

Dill, Stephen, Nadav Eiron, David Gibson, Daniel Gruhl, R. Guha, Anant Jhingran, Tapas Kanungo et al. "SemTag and Seeker: Bootstrapping the semantic web via automated semantic annotation." In Proceedings of the 12th international conference on World Wide Web, pp. 178-186. ACM, 2003.*

(Continued)

*Primary Examiner* — Farhan Syed
(74) *Attorney, Agent, or Firm* — Laura E. Gisler

(57) ABSTRACT

Annotations can be handled by a computer system that receives a query that specifies parameters for extraction of particular annotations from a set of annotations. Annotations include metadata that describes properties of the associated text fragment. A first entity subset, a second entity subset and a relations subset of annotations are extracted from an annotated text corpus. Contextual information relative to the extracted annotations is also extracted from the corpus. A user interface is generated to display frame elements that include the extracted annotations subsets and the extracted contextual information. In response to selections to the frame elements, the system receives input that specifies modifications to the annotations. Based on the input received, the set of annotations is modified in the annotated text corpus.

10 Claims, 8 Drawing Sheets

(56) References Cited

U.S. PATENT DOCUMENTS

| | | | | |
|---|---|---|---|---|
| 9,164,990 B2* | 10/2015 | Vainer | | G06F 17/30 |
| 2005/0108001 A1* | 5/2005 | Aarskog | | G06F 17/271 |
| | | | | 704/10 |
| 2005/0125447 A1* | 6/2005 | Cragun | | G06F 17/241 |
| 2013/0135332 A1* | 5/2013 | Davis | | G06F 17/30 |
| | | | | 345/589 |
| 2013/0159926 A1* | 6/2013 | Vainer | | G06F 17/30 |
| | | | | 715/804 |
| 2013/0325881 A1* | 12/2013 | Deshpande | | G06F 17/30292 |
| | | | | 707/755 |

OTHER PUBLICATIONS

Dill, Stephen, Nadav Eiron, David Gibson, Daniel Gruhl, R. Guha, Anant Jhingran, Tapas Kanungo et al. "A case for automated large-scale semantic annotation." Web Semantics: Science, Services and Agents on the World Wide Web 1, No. 1 (2003): 115-132.*

Gut, Ulrike, Jan-Torsten Milde, Holger Voormann, and Ulrich Heid. "Querying Annotated Speech Corpora." In Speech Prosody 2004, International Conference. 2004.*

Boguraev et al., "A System for Retrieving, Visualizing and Editing Semantic Annotations", U.S. Appl. No. 15/158,757, filed May 19, 2016.

List of IBM Patents or Patent Applications Treated as Related, dated May 17, 2016, pp. 1-2.

Anonymous, "Approach for a Business User Consumable Data Mapper Application," An IP.com Prior Art Database Technical Disclosure, Jun. 26, 2013, IP.com No. IPCOM000228647D.

Anonymous, "Meta model for Data Format Description Language (DFDL) annotations using XML schema," An IP.com Prior Art Database Technical Disclosure, Mar. 15, 2012, IP.com No. IPCOM000215991D.

Mell et al., "The NIST Definition of Cloud Computing," National Institute of Standards and Technology, U.S. Department of Commerce, Special Publication 800-145, Sep. 2011.

* cited by examiner

SYSTEM FOR RETRIEVING, VISUALIZING AND EDITING SEMANTIC ANNOTATIONS

BACKGROUND

The present disclosure relates to a computer method, system, and computer program product for retrieving, visualizing and editing semantic annotations, and more specifically, for enabling corpus-wide viewing of annotations and annotation contexts and making changes to annotations in entity and relations annotations environments.

Computer processing circuits carry out a variety of instructions of a computer program by performing basic functions contained within the stored instructions of the program. These instructions can be modified to carry out a number of different functions and processes. These functions and processes can be carried out over a network, which allows for greater connectivity between personal computers, smart phones, laptops, and other devices.

Annotations are used in natural language processing, often to provide machine-readable information highlighting certain, often semantic, characteristics and elements of the text, and expose them for the use by computational modeling of text processing. Markup languages are used to annotate text in a way that is visually distinguishable from that text and that often provides semantic or other kinds of information that is associated with the annotated textual segments (mentions).

SUMMARY

Embodiments of the present disclosure are directed toward a computer implemented method for modifying a set of annotations that include metadata describing properties of the associated text fragments within an annotated text corpus. A computer system can receive a query specifying parameters for annotations from the set of the annotations. The computer system can extract, from the set of annotations and by the query, a first entity subset of annotations, a second entity subset of annotations, and a relations subset of annotations between the first entity subset of annotations and the second entity subset of annotations. The system can also extract, from the annotated text corpus, contextual information relative to the extracted annotations. A user interface having display frames populated by frame elements that include the entity subsets of annotations, the relations subset of annotations, and the contextual information can be generated and the system can receive, responsive to selections of the frame elements, input specifying modifications to the annotations. Modifications, based on the input specifying modifications to the annotations, can be made to the set of annotations in the annotated text corpus.

Certain embodiments are directed toward a computer system comprising at least one processor circuit that includes a number of engines, configured to carry out an indicated process. In embodiments, the computer system's processor circuit can include an extracting engine configured to receive a query specifying parameters for annotations from the set of the annotations and extract, from the set of annotations and by the query, a first subset of annotations, a second entity subset of annotations, and a relations subset of annotations between the first entity subset of annotations and the second entity subset of annotations. The extracting engine can also be configured to extract, from the annotated text corpus, contextual information relative to the extracted annotations. The computer system's processor circuit can also include a processing engine configured to generate a user interface having display frames populated by frame elements that include the entity subsets of annotations, the relations subset of annotations and the contextual information. The processing engine also can receive, responsive to selections of the frame elements, input specifying modifications to the annotations. The computer system's one or more processing circuits can also include an updating engine configured to modify, based on the input specifying modifications to the annotations, the set of annotations in the annotated text corpus.

Certain embodiments are directed toward a computer program product for handling annotations. The computer program product may be comprised of a computer readable storage medium having program instructions embodied therewith, wherein the computer readable storage medium is not a transitory signal per se, the program instructions executable by a computer processing circuit to cause the circuit to perform a method comprising: receiving a query specifying parameters for annotations from the set of the annotations; extracting, from the set of annotations and by the query, a first entity subset of annotations, a second entity subset of annotations, and a relations subset of annotations between the first entity subset of annotations and the second entity subset of annotations; extracting, from the annotated text corpus, contextual information relative to the extracted annotations; generating a user interface having display frames populated by frame elements that include the entity subsets of annotations, the relations subset of annotations, and the contextual information; receiving, responsive to selections of the frame elements, input specifying modifications to the annotations; and modifying, based on the input specifying modifications to the annotations, the set of annotations in the annotated text corpus.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
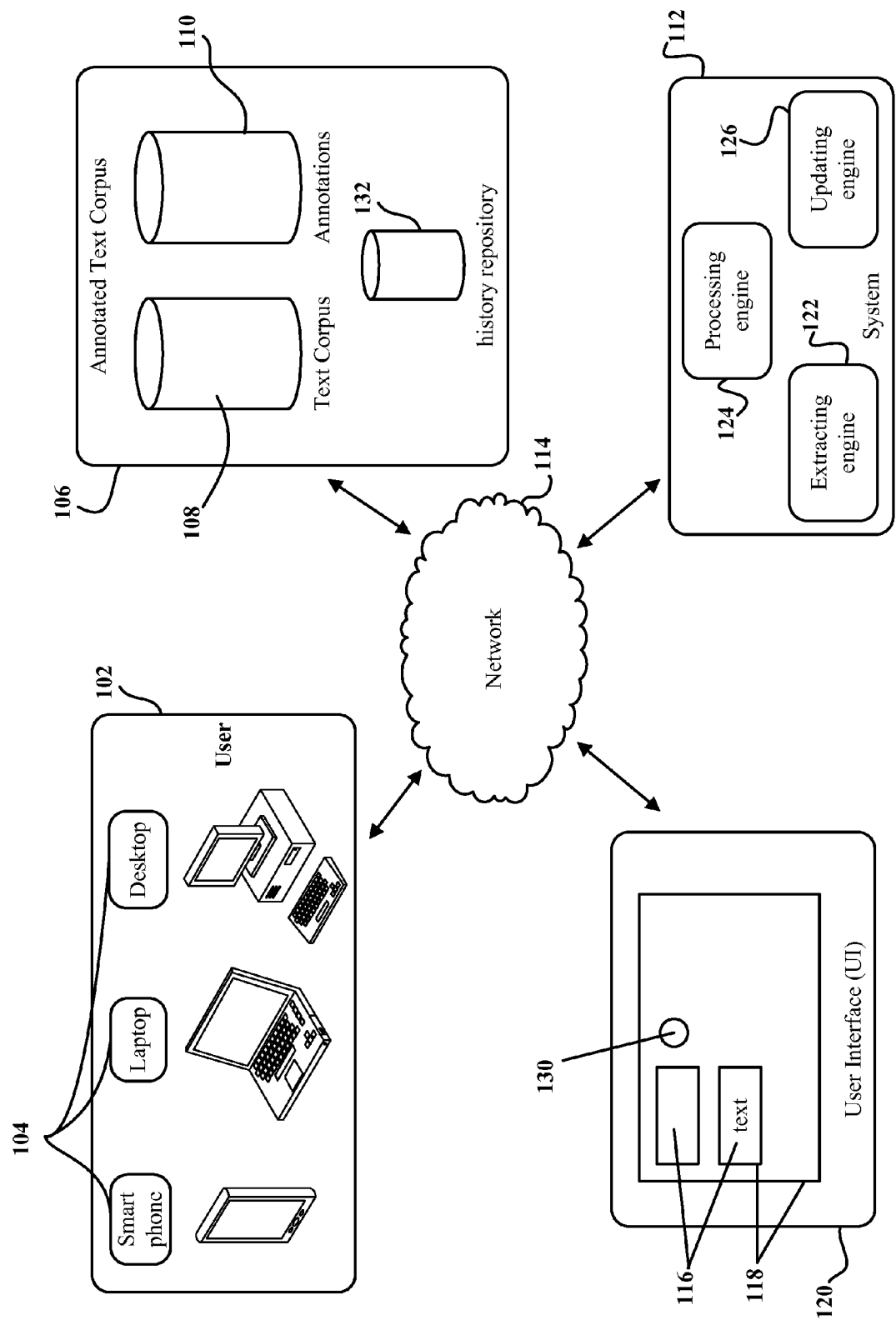
FIG. 1 depicts a system for extracting and displaying annotations from an annotated text corpus in relation to a structured query and providing a means of editing the annotated text corpus via the display, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system for extracting and displaying annotations in an annotation environment system, for the purpose of, among others, editing them, more particular aspects relate to enabling the shifting between document text-based views of annotations and contextually-driven views of those same annotations. While the present disclosure is not necessarily limited to such applications, various aspects of the disclosure may be appreciated through a discussion of various examples using this context.

The exploration of the annotations and their associated context is one of the key affordances for understanding the various ways concepts are expressed in text and used in building rule-based or machine learning (ML)-based systems from ground truth specified through annotations or for evaluating and refining the performance of rule-/ML-based systems that have generated these annotations.

For purposes herein, annotations can be construed as "stand-off" annotations over natural language text which serve as entity and relation markers, further tagged with semantic labels (aka semantic types). Annotations include metadata describing properties of the associated text segments. According to embodiments, these annotations can be explored by a user, the system providing various organizational styles, dependent upon user preference. In addition to exploration, the annotations can also be edited. The exploration0 capabilities may be an independent feature or used in conjunction with the editing function.

Various embodiments are directed toward a computer system that can shift between unstructured, document text-based views of annotations and structured, contextually-driven views of annotations, thus removing clutter and distracting details and bringing together contextual and semantic similarities among instances, and/or configurations of instances, of similar annotation types for, among other purposes, editing. The retrieval and display can be dictated by a structured query, the language of which can include expressions for specifying constraints to various aspects of the annotations, relations therebetween, context, and/or different forms of visualization such as a matrix or a graph. Various figures throughout the disclosure display a grid-like display, e.g. a display frame or set of frames, of the extracted data; however, this form is not intended to limit the embodiments of the disclosure.

In some embodiments, the system can be configured to extract annotations and populate, in response to a query, a user interface (UI) with selectable options and display frames that contain frame elements. A query may be sent from a laptop, smartphone, or other user. The frames can be populated by frame elements. As discussed herein, the frame elements can include the extracted annotations, contextual information related to the annotations, or other information. Based on input received from the UI, the frame elements can be changed. A user, here an editor or annotator, can interact with the system using selectable options on the display, like frames and frame elements, to provide input and specify changes. In some embodiments, annotations can be modified directly, through system-provided access to the annotated text corpus, via the frame elements. In either instance, the change can be incorporated into the annotated text corpus to reflect the edits to the annotations in the broader annotated text corpus, as specified by a user. Additional changes can be made to the frame elements in the UI. At any point in the process, a new query can be specified which will repopulate the UI frame(s) with new frame elements.

Turning now to the figures, FIG. 1 depicts a system for extracting and displaying annotations from an annotated text corpus in relation to a structured query and providing a means of editing the annotated text corpus via the display, consistent with embodiments of the present disclosure. The various elements depicted in FIG. 1 can be implemented using various computer processing circuits. For instance, the various engines described herein can be implemented on one or more computer processing circuits, and more particularly on various computers, servers and the like. A user 102 can initiate the system by transmitting a query to the system. A few examples of a user are depicted by the images 104, including a smart phone, laptop, desktop, or others. In some embodiments, a user can specify various parameters for a query which specify subsets of annotations for extraction from an annotated text corpus 106 to display via a user interface (UI) 120, for examination and, possibly, modification.

In certain embodiments, the information can be sent and received over one or more networks 114. The networks can include, but are not limited to, local area networks, point-to-point communications, wide area networks, the global Internet, and combinations thereof.

In some embodiments, a user transmits a query to a system 112, which is comprised of engines, for example an extracting engine 122, a processing engine 124, and an updating engine 126, to initiate the system. An extracting engine 122 can, based on the parameters specified in the query, extract sets of annotations and contextual information from an annotated text corpus 106. Contextual or "context" information, for purposes of this disclosure, can refer to the text "mention", or fragment of text which is being annotated by a particular annotation, as well as the original document text around the occurrence or mention. The amount of original document text extracted and displayed can be specified by the query as well. An annotated text corpus 106, from which the annotations and context information can be extracted, can be a text corpus 108, and the annotations 110 that include metadata describing properties of the associated text fragments in a text corpus 108.

For example, a text corpus may contain the text fragment "the weather in NYC". Most English-speakers would know that the fragment addresses the weather, as in the temperature, precipitation, humidity levels, etc., in a city of New York state, on the east coast, NYC. Annotations can allow a computer to "understand" some meaning of the text through marking and categorizing words in it. For example, the text fragment "NYC" could be categorized as a "city" or as a "city nickname". Thus, this very simple illustration shows how metadata included in annotations describes properties of the associated text fragments in a text corpus.

The sets of annotations extracted may include, for example, subsets of entity annotations, the annotations which associate semantic type labels with text fragments (like annotating "NYC" with a label "CITY". The sets may also include subsets of relations annotations, which can 'bridge' two entity annotations, to provide contextually-driven connections between two entity 'anchors', and specify relational dependencies among text annotations.

In certain embodiments, a processing engine 124 can generate a user interface (UI) 120, in response to the extractions specified by the query parameters. The UI can provide selectable options like "buttons" on a screen, for example shown at 130, in a frame or frames, per 118. Frame elements can include specified subsets of annotations, contextual information extracted about the annotations, mention spans, document location, and/or other information that can populate the frames, per 116. Additional examples and explanations of the UI 120, frame 118, navigational buttons 130, and frame elements 116 are provided in the discussion of FIGS. 3 and/or 4.

According to embodiments, a UI 120 can receive input specifying modifications to a frame element (e.g. an annotation) through user-end edits to the frame element 116. The UI 120 can also receive input specifying how the set of annotations and relations should be reorganized and redisplayed, to afford a user the ability to browse the annotated corpus, and better understand syntactic and semantic generalizations manifested by annotations and relations subsets. For example, the input can specify a modification to one of the annotations in a frame element (i.e. an entity or relation annotation, or others). The change can be made to the frame element 116 through a UI 120, and the annotation modification can then be incorporated, by an updating engine 126, into an annotated text corpus 106. In some embodiments, a UI 120 can receive input that specifies a request to access the annotated text corpus 106 directly (e.g. by selecting a document name that is listed within a frame 118). There may also be more than one corpus, and/or sets of corpora. A query may also specify a particular corpus or subset of corpora for which to apply the parameters. A processing engine 124, can generate a new frame 118 on a UI 120 which displays the specified data and/or data from a specified document in an annotated text corpus 106 as an editable frame element 116. The UI 120 can receive input that specifies a change to annotations 110 in an annotated text corpus 106, via the newly displayed frame. These changes can then be incorporated, by the updating engine 126, into the annotated text corpus or corpora 106. For additional description of this process, see FIG. 5.

In some embodiments, an updating engine 126 can incorporate the changes specified by the user to the annotated text corpus 106 without other, additional user input, and the processing engine 124 can update frame elements 116 of the UI 120 automatically, in response to the changes in the annotated text corpus 106 to reflect these changes. In some embodiments, the user-end changes received through the UI 120 and incorporated into an annotated text corpus 106 via an updating engine 126 can appear when the frames 118 of the UI 120 are repopulated by new elements 116, in response to a new query. In some embodiments, changes could also appear in a combination of the above, with some changes appearing in the UI 120 without any additional user input, and others appearing in the UI 120 in response to a new query.

In certain embodiments, a particular corpus may be accessed to be viewed and/or edited by a plurality of users. Various aspects of the UI 120 may be tailored to allow for editing and updating process when used by multiple users. For example, a notification on the UI 120 could alert a user that another user was currently accessing and/or editing the corpus. For example, a notification on a user's UI could alert a user of the identity of another of a plurality of users by providing identifying information such as the user's location, supplied identity, or other information. The notification could also provide the location in the corpus of the other user's editing. The information could be correlated to the user inputting the edit as well as the user's identifying information. This information could follow the edit throughout the update cycle, from the UI 120 to the annotated text corpus 106, and upon refresh appear in the newly populated UI. This could allow a plurality of users to connect and communicate in real-time or as the edits occur. Thus multiple annotators could work on the same corpus, while avoiding confusing their own edits with those made by others. Communication between these multiple users could be facilitated by the system in order to further reduce miscommunication and error (i.e. to ensure changes do not undo assumptions across different individuals). This could be helpful if, for example, a user is restricting an annotation category by dividing it into two, while the other is continuing to add to the single, original, category indiscriminately. Rather than waiting for the edits to be made and appear on the UI, and then dividing them into the two categories, the user could communicate with the other annotator to agree upon a strategy.

In certain embodiments, modifications made by a particular user could be correlated with that user or identifying information and stored in a history repository 132. This history repository 132 could exist as part of the annotated text corpus 106. The annotated text corpus structure depicted here need not be a rigid structure. The annotated text corpus 106, and its components listed here, could be spread out over a number of corpora or databases and could be queried via a federated search engine. The inclusion of a history repository 132 could allow users working on the same corpus later in the corpus' evolution to identify the user that made the change. The history repository 132 could additionally or alternatively contain comments about the edits to the annotations. These comments could be added at the time the modifications are made by annotators who made the edits, or other annotators. The comments could be added by the original annotator or any other annotator at any point later in the evolution of the corpus. These comments could be helpful to later annotators understand when and why changes were made. These comments could also help to redirect the changes for the future, or advise a new direction for a particular annotations, or serve other purposes.

Some embodiments could provide a setting which allows a user to restrict editing access to a single user, or a particular number of users, either indefinitely, or for a certain period of time or number of changes. A setting could also allow only a particular user to edit the corpus while still providing viewing capabilities to other users.

In some embodiments, an additional query can be processed by the engines in a system 112, in response to input by a user 102. An extracting engine 122 can access an annotated text corpus 106 and repopulate frame elements 116 according to the parameters specified by the query. At any point a user 102 can input changes to the system via a UI 120, as well as input parameters for a new query, which can be processed by the engines in 112, as detailed above.

Figure 2:
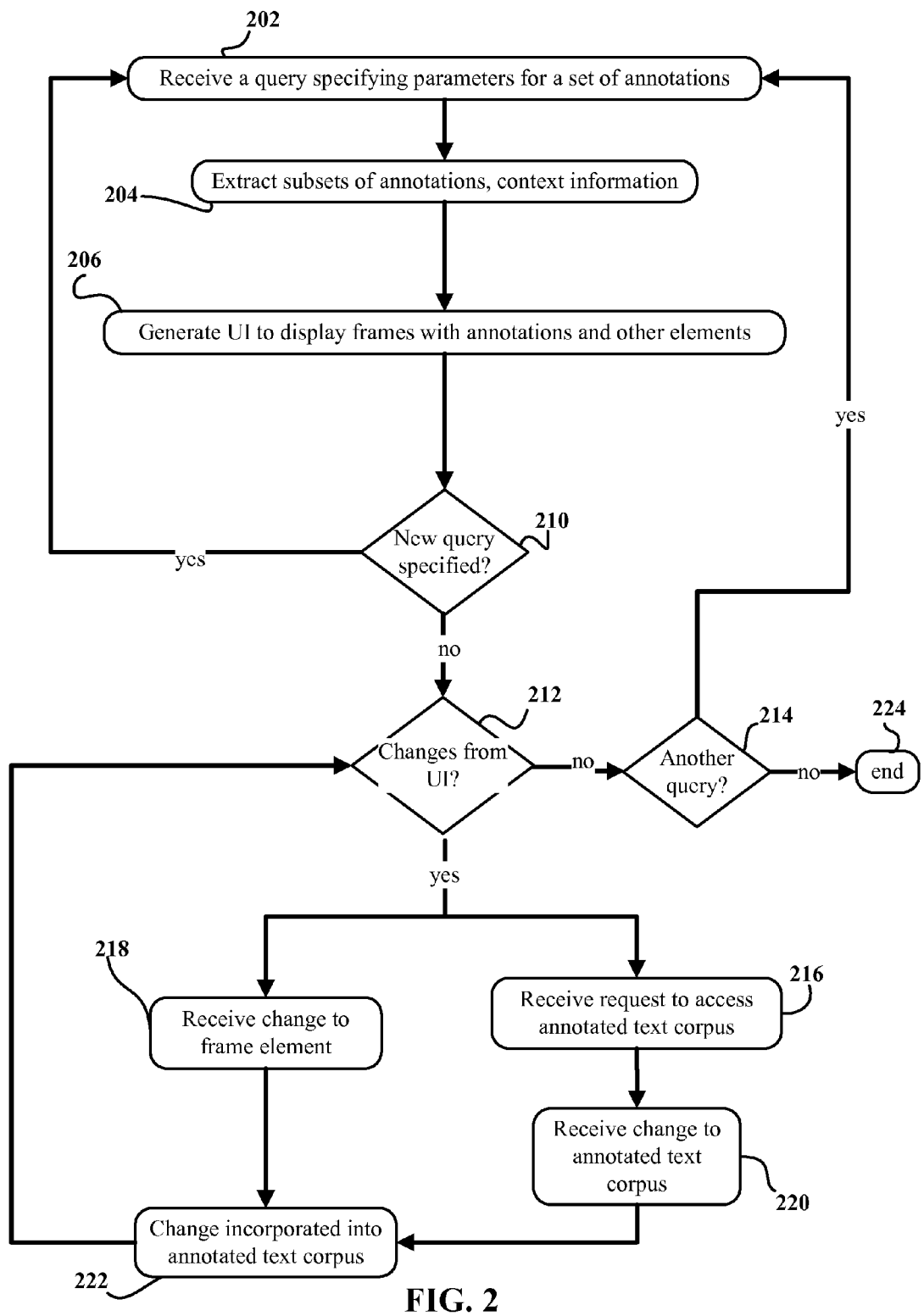
FIG. 2 depicts a flow diagram for extracting and displaying annotations in response to parameters in a query, and providing, among other things, editing capabilities, according to embodiments of the present disclosure.

FIG. 2 depicts a flow diagram for extracting and displaying annotations in response to parameters in a query, and providing, among other things, editing capabilities, according to embodiments of the present disclosure. Consistent with embodiments, the flow begins when the system receives a query specifying parameters for a set of annotations in an annotated text corpus, per block 202. As indicated herein, the query can be submitted using a smart phone, a laptop, a personal computer, or another device. As discussed herein, the query can specify parameters that direct the extraction of a particular subset or subsets of annotations, by an extracting engine, from an annotated text corpus. As mentioned herein, the annotations in the corpus include metadata describing properties of the associated text fragments within a text body, for example, a text body contained within an annotated text corpus. For example, an annotated text corpus could consist of a text corpus of the medical charts for all patients within a hospital system and the annotations that apply to the text in those charts. A specific example of a piece of information extracted and displayed by the system could include a fragment of text, or "mention", that is "right side of her abdomen." The phrase "right side of her abdomen" is a fragment of text that can convey meaning to a human user; this fragment of text could be annotated and include metadata describing properties of the text to a computer or other machine learning apparatus. An annotation label associated with this particular mention could be "region", and/or others, which specify to a computer or other ML apparatus that the particular mention "right side of her abdomen" pertains to a particular "region" of, in this case, the body.

Consistent with embodiments, subsets of annotations, context information, and/or other information, can be extracted from an annotated text corpus based on the parameters specified in the query, per block 204. In some embodiments, parameters in the query may specify types, categories or characteristics of annotations, among others. For example, a query may specify a particular type of annotation label (e.g. "region"), instances of the label "region" could be extracted, along with mentions, which could include "right side of the body", as well as others like "epigastric region", "gallbladder", "upper extremity", "left foot", "lower back" and/or "left upper quadrant (LUQ)".

Notably, in some embodiments, the query language may include expressions for specifying constraints on entity mention instances, types, sets of types, or others. For example, the "region" query could be constrained to the set of specific mentions of "epigastric region". In this case, the "region" labels associated with text that includes "epigastric region" could be extracted in response to the query. Similarly, when specifying restrictions to relations annotations, the query language is capable of expressing specifications of constraints on the domain entity (an entity annotation) and range entity (an entity annotation) of a relation, as well as on the relation itself. The language further allows composition of such specifications using AND/OR, in order to, as above, combine entity constraints and relation constraints in an exclusive or nonexclusive manner. An example of a structure for the above described is shown below:

[{Domain Restrictions} AND/OR {Relation Restrictions} AND/OR {Range Restrictions}]

For example, a relation annotation, "location of" could be limited by a specific mention in a domain entity "region" and/or range entity "chief complaint". Thus, the query specifications are directed toward the extraction and display of only those relation annotations labeled "location of" which are anchored by the entity type or label "region" and/or "chief complaint" (the and/or being another option). Thus, for example, an instance of a relation annotation label "location of" which is anchored by an entity annotation label "onset" and an annotation over the text fragment "allergy" would not be extracted, regardless of whether "AND" or "OR" was included in the query.

In some embodiments, a processing engine can generate a user interface (UI) with selectable options, like frames, in response to the query, per 206. Frames of the UI can be populated by elements which, as mentioned elsewhere, can include annotation information and/or other information helpful to identifying, locating, and/or understanding a particular annotation. For example, the annotation labels "region" and "chief complaint" could populate frames for each annotation extracted. The relations annotation label "location of" could also be a frame element. The frames can also be populated by contextual information (i.e. text surrounding the mention span), extracted by the query, which can relate to the extracted entity and relations subsets. For example, each of the mention instances could appear as a frame element, with the contextual information (i.e. relevant text surrounding the mention) displayed in the same or a different frame, in order to provide a user viewing the UI with helpful information in an organized structure. A mention instance with context for the extracted annotation "region" could be "She has pain in the epigastric region", with "epigastric region" as the mention instance and "she has pain in the" as the context information. Additional explanation regarding the display of the various pieces of information on the UI are provided in the discussion of FIGS. 3 and 4.

Consistent with embodiments, the system can receive input specifying a new query. A new query, as in block 210, may be specified at any point in the flow, and is not limited to its current location in the figure. Rather, it is a convenient place to indicate that at this, or many other places, a new query may be specified, and the frames may be repopulated in response to the query-directed extractions. A new query at this location, however, may be useful if, for example, the parameters specified in the query result in too few and/or too many results displayed via the UI. A new query could also be helpful if the previous query yielded results a user found imprecise or irrelevant. The system can receive the query, and the flow can begin again at block 202, as illustrated in the path from block 210 to block 202.

Figure 3:
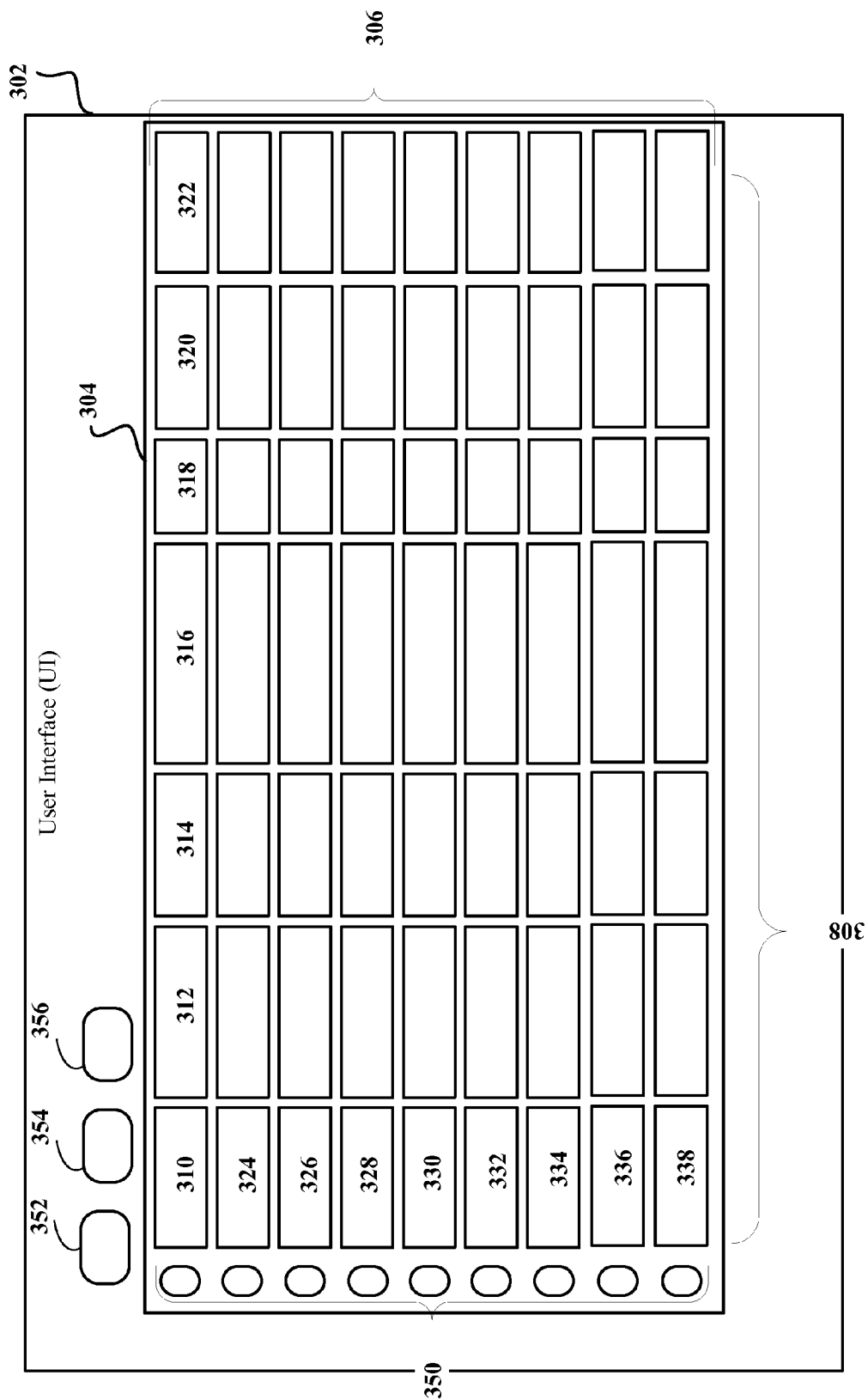
FIG. 3 depicts a user interface, consistent with embodiments of the present invention.

Consistent with embodiments, at block 210, a new query may not be specified, and the system can receive input specifying changes via the selectable options, like navigational buttons, of the UI, per decision block 212. The selectable options can include the frame and frame elements (e.g. annotations or context information), or other displayed items, but can also be navigational buttons, distinguishable from the frames or frame elements, as illustrated in FIG. 3. A user can browse, inspect, visually reorganize the display of retrieved annotations, types, mentions, relations, and contexts, to assess correctness, understand the data in the corpus, and specify modifications, if necessary.

In some instances, input received from the UI may indicate a change to the frame element itself, per block 218. For example, if an annotation label "region" is extracted with the mention "regional limb-based chemotherapy", with "limb-based" annotated by "region", a user may detect this as a mis-annotation, since "regional limb-based chemotherapy" is a name of a type of chemotherapy, not a "region" of a subject as implied by the annotation label. In this particular example, the user may be familiar with other annotation labels applicable to the particular text corpus, such as "plan" (as in "treatment plan"). A user can edit the text displayed in the frame element on the UI from "region" to "plan". In this example, the system can receive the edit, the frame element change from "region" to "plan", as shown at block 218. The change can be incorporated by an updating engine into the annotated text corpus, per box 222. Thus, for example, the annotation "region" would be changed, as modified in the frame element of the UI, to "plan" in the annotated text corpus, for that particular mention.

In certain embodiments, a change could also or alternatively be specified via a direct access of the text corpus, as illustrated by the path from block 216 through block 220 to block 222. For example, a user manipulating the selectable options on the UI could wish to view and/or edit text displayed in a frame element directly in the source document in a text corpus. The system can receive a request to access the annotated text corpus via a UI, per block 216. The request can be processed by an engine, and a frame in the UI can display data from the relevant portion of the annotated text corpus. A user can make a change to the data displayed in a frame via the UI, and the change can be transmitted to the system, received, and processed, per block 220.

For example, a query may retrieve some elements with which the user/annotator is less familiar. In order to determine the accuracy of the entity or relations annotation labels, the user/annotator may want to access and view the annotation and its associated text, in order to understand the annotation's place in the broader context of the corpus. The change made directly to the annotated text corpus displayed on the UI can be received, per block 220, processed by an updating engine, and incorporated into the relevant annotated text corpus, per block 222.

In some embodiments, a corpus-wide change to every, or many, instances of a particular annotation label may be preferable. In some situations, it may be preferable for a system to be configured to incorporate changes to a single annotation label across the entirety of the annotated text corpus. In this case, a setting or selection could specify a corpus-wide change to an annotation (i.e. all instances of a single annotation label) based on an edit to a single annotation label. This option could be helpful if a particular annotation needs to be changed, due to imprecision, inaccuracy, or another reason. As in the above steps, the UI-facilitated change could be received, per block 218 or block 220, processed by an engine, and, based on a particular selection, incorporated corpus-wide, per block 222, in a broader manner, as described herein.

In some instances, it may be preferable for changes made to a particular annotation label instance to be incorporated into only some instances of that label, but more than the single instance, in the annotated text corpus. For example, an annotator may wish to refine a particular annotation label by narrowing its meaning. Thus, it would be helpful to see all instances of the annotation label and determine, based on context and/or other relevant information, to which of the new categories the current annotation label should be assigned. For example, if the entity annotation label "region" appeared to be too imprecise, with geographic regions, anatomical regions, or others all collecting under the "region" annotation label, the display feature could allow for a much easier thorough manual re-annotation of the label. Alternatively, a feature could provide for an automated sorting under two (or more) new categories of region, specifying and changing those that are a "geographic region" and those that are an "anatomical region" accordingly.

In certain embodiments, a corpus-wide change resulting in the combination of two separate annotation labels into a single annotation label may be preferable. This process could be done manually or automatically. In some embodiments, the decision could be made by the system's response to a user-end selectable option. A setting could allow all or many instances of a first entity annotation label and all or many instances of a second entity annotation label to merge into the same annotation label or a new annotation label, essentially combining the two subsets of annotation labels. For example, if a first entity annotation label, "image or procedure result" and a second entity annotation label "lab test result" appeared to be, based on the UI display, too specific, which was resulting in imprecise and inconsistent annotation labels for similar mentions, a feature could provide an option for combining all or many instances of "lab test result" with all of many instances of "image or procedure result" into a broader, new annotation label, "diagnostic results".

Consistent with certain embodiments, the system can be configured to respond to any additional changes to the UI detected via the selectable options, such as the frame elements, per block 212. If no changes are detected, the system can receive input indicating a request for another query, per decision block 214. If an additional query is detected, the system can proceed through the flow beginning at 202, as detailed above. If no additional query is detected, the particular interaction ends, per block 224.

FIG. 3 depicts a user interface, consistent with embodiments of the present invention. A user interface 302 can have one or more selectable options which allow a system to receive feedback from a user or users. A UI 302 can have one or more frames, one which is shown in the figure as 304. A frame can consist of frame elements, illustrated by the blocks labeled by 306 and 308, and/or selectable options like navigational buttons. As mentioned herein, particularly in FIG. 2, the frame elements of the UI can be populated by the annotation information, contextual information, and other information extracted from an annotated text corpus in response to a query.

In certain embodiments, each row of frame elements, for example the frame elements illustrated by blocks 310, 312, 314, 316, 318, 320, and 322 could relate to one particular relation annotation instance (i.e. the relation annotation label, the two anchoring entity annotation labels, the contextual information for each, location of text being annotated, and others). The examples provided herein need not limit the order in which the elements are displayed, as they can be reordered based upon user preference. Rather, the description is provided to illustrate a particular use case. For example, block 312 and block 320 could display the 'anchoring' entity annotation labels, entity 1 and entity 2, respectively. Block 316 could display a relation annotation label, which 'bridges' the entity annotations in block 312 and block 320. In some embodiments, contextual information for each of the annotations, which may include the mention span (i.e. the portion of text to which the annotation applies) as well as any number of words surrounding the text portion, could populate block 318 and block 314. The frame elements, represented by block 310 and block 322 could contain other helpful information about the annotation, including, for example, the document number or other document identifier (of the document in which the mention span is contained) in block 322, and the corpus name or title in block 310. As with the annotation labels, some of these pieces of information could be active links, providing a user with access to the document or text corpus, based on a selection of the frame element. This could be replicated, but for different relation annotation instances, in each of the rows bracketed in 306 (the rows starting with blocks 310, 324, 326, 328, 330, 332, 334, 336, and 338).

In some embodiments, the top row of a grid display of the extracted data could serve as a header row. For example, the frames of blocks 310-322 could be populated by header titles, with the first row of an annotation instance beginning at the row starting at block 324.

According to embodiments, the user interface could include any number of selectable options that serve as navigation buttons, as illustrated by oval blocks labeled 350. These buttons could be used to access a document from which a particular annotation instance had been extracted. For example, cell 324 could contain the location information (i.e. document or corpus name) for the annotation in the row beginning at block 324. The button in the row could be used for navigation to move to or access the document text itself.

The display could also include other buttons, represented by blocks 352, 354, and 356. The buttons could be located elsewhere on the screen and there could be as many or as few as deemed appropriate for a particular use. These buttons can be used for sorting, filtering, and generally re-organizing the display of annotations and/or relations sets, or for other purposes.

Figure 4:
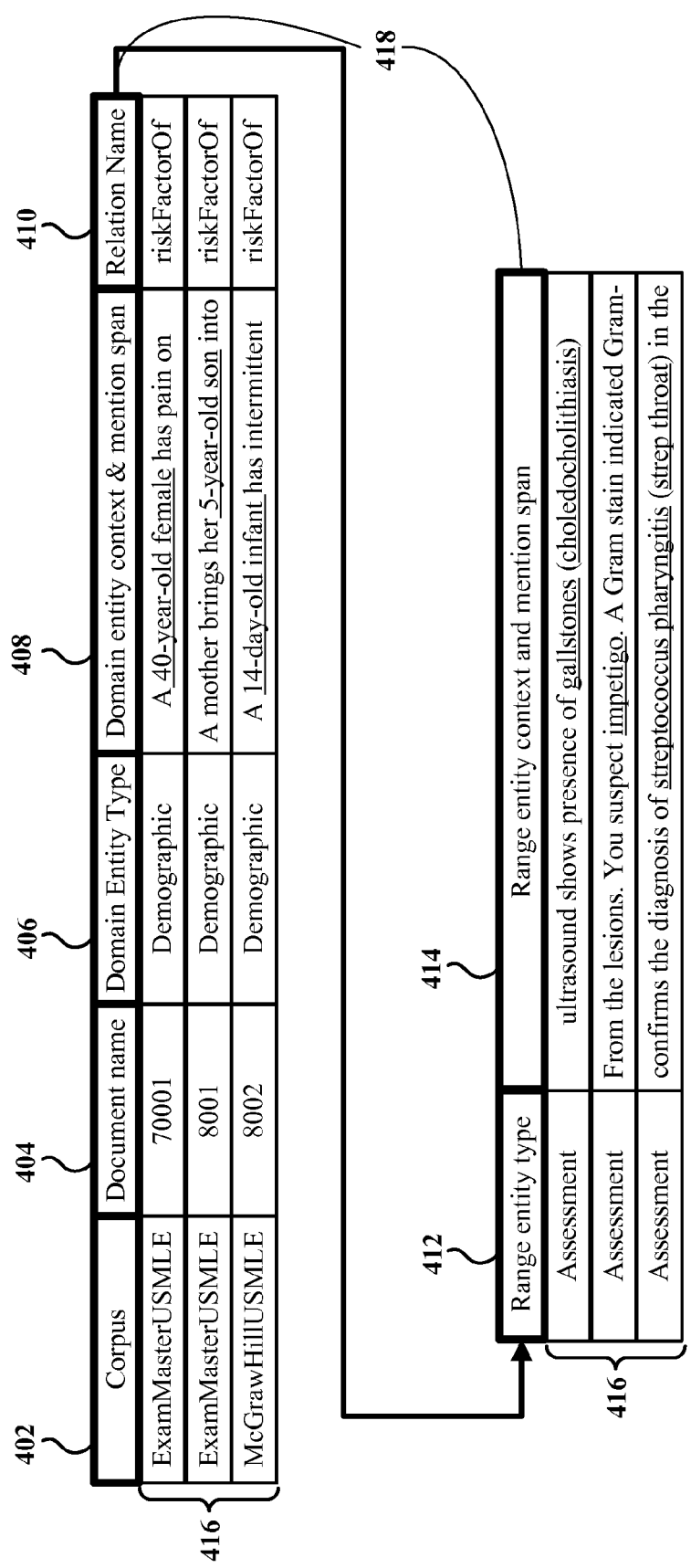
FIG. 4 depicts a display frame of a user interface, with more specific examples provided, consistent with embodiments.

FIG. 4 depicts frames of the user interface, with more specific examples provided, consistent with embodiments. Like FIG. 3, FIG. 4 depicts an embodiment of the user interface of the present disclosure, but unlike FIG. 3, FIG. 4 provides more specific examples. The figure is intended to show a single grid, with the arrow beginning in header row 418 at column 410 and continuing to column 412 indicates a continuity between the two sections, with 410 and 412 being adjacent columns. Consistent with embodiments, a top row, labeled 418, could serve as a header row and provide labels to each of the columns. The subsequent rows descending from the header row, labeled 416 in FIG. 4, can contain the extracted content, as detailed herein. Each row can relate specifically to a certain relation annotation extraction, as detailed below.

For example, each of the frames of column 402, labeled "corpus", could contain the name of the text corpus from which the particular mention had been extracted. Similarly, each of the frames of column 404, labeled "document name", could contain the name of the document from which the annotation and mention had been extracted. For example, this helpful information could be displayed along with the rows containing the specific annotation information, in order to provide additional context or better facilitate in-text edits to annotations. A third column, 406 in this embodiment, is labeled "Domain Entity Type", and contains the domain type constraints indicated in a query. It is important to note that "domain" as used here in "domain types" is used in its technical sense (broadly defined as an argument of a relation linking two entity mentions), and it is not intended here to refer to more general areas of knowledge such as a "medical domain" or "financial domain". The frames comprising this column (406) contain the domain entity type constraint "demographic" here. In an adjacent column, column 408, the label "Domain entity context & mention span" indicates the context of the subsequent frames in the column can include the particular mention as well as the text surrounding the mention. This can be the information referred to throughout the application as "contextual information" or simply "context". A readily apparent benefit to this display includes the organized manner in which a user (e.g. an annotator) can see both entity and the mention (fragment of text) to which the annotation is applies. Navigational buttons, as illustrated in FIG. 3 and mentioned throughout, can allow an annotator to apply different organizational principles to the information displayed.

A second entity type constraint and its associated mention and anchoring text can be displayed, as indicated by columns 412 and 414. The frames of column 412, the column labeled "Range entity type" in its header frame, can display the second entity type constraint. As with the mention spans of the first entity annotation instances, the mention span of the second entity annotation instances can be displayed in a frame adjacent to the entity type. The frames of column 412 show the second entity type is "assessment", and the range entity mention spans are contained in the frames of column 414. The mentions themselves are underlined in the figure, and can be marked in some way to distinguish the mention from the surrounding context.

In some embodiments, a column of frames displaying the relations annotation labels is located between the two "anchor" entity types. Here, that column labeled "Relation Name" is numbered 410 and contains frames with the relation bridging the two entity types, "riskFactorOf". Thus, a single row (i.e. a single row of those labeled 416) can contain location information (column 402 and 404), entity type and mention information (columns 406, 408, 412, and 414, where 408 and 414 may additionally contain indicators of mention spans, and contexts thereof), as well as the relation name (410) for a single instance.

Figure 5:
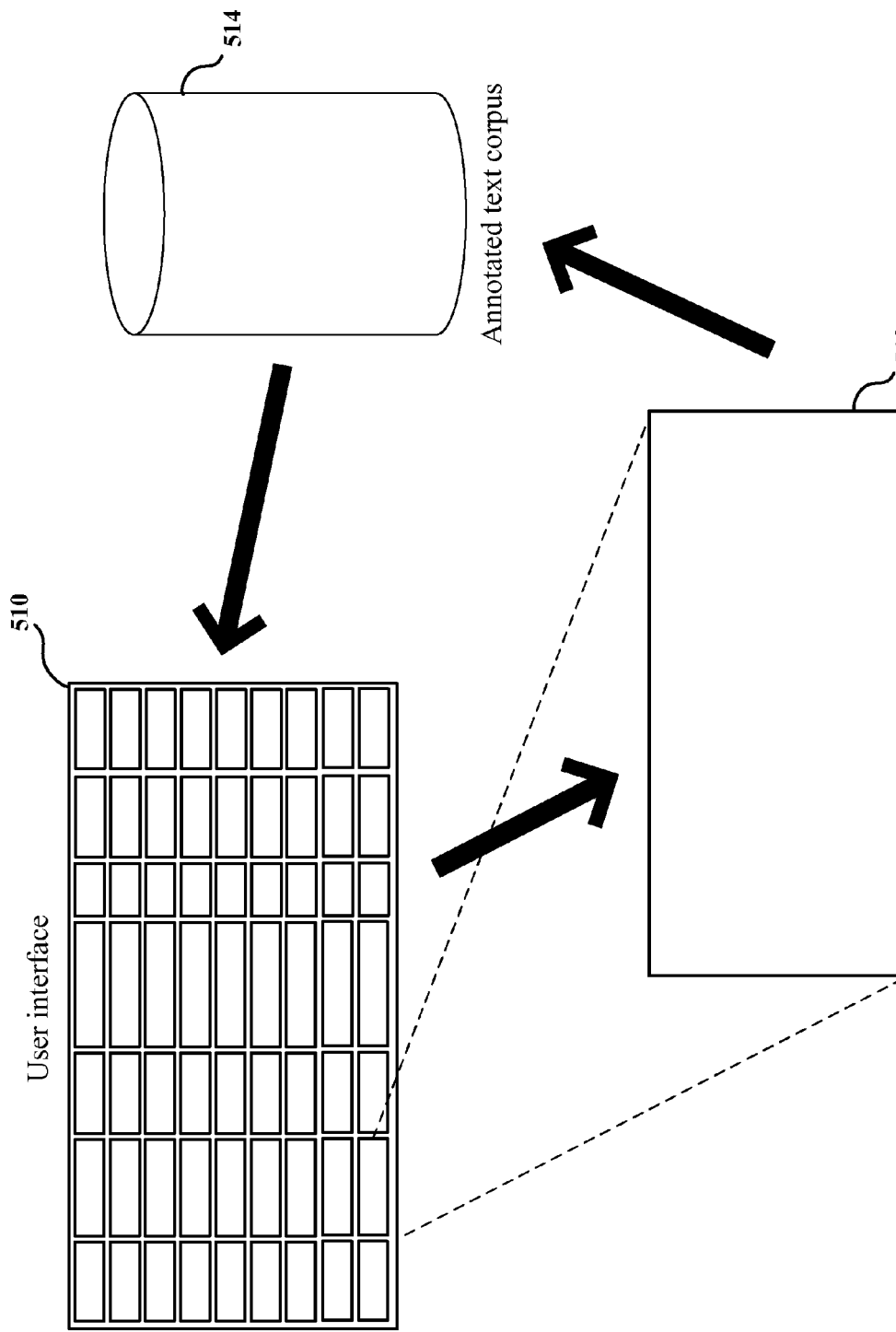
FIG. 5 depicts a flow of edits of the system, according to embodiments.

FIG. 5 depicts a flow of the system, according to some embodiments. Embodiments of the present disclosure provide for a system that can receive and process input received through a user interface 510. As described herein, the UI can include frames with selectable options, as illustrated at 510, and in previous figures. Alternatively or additionally, as mentioned elsewhere, the UI can include navigational buttons distinct from the frame or frames, which can facilitate the access of documents, or other purposes. In some embodiments, and as discussed in previous figures, some of the frames can include location-identifying information, such as document names and corpus names. As discussed herein, this information can be associated with the relation annotation and/or the set of associated annotations displayed in the same row of frames on the UI. In response to a selection of a document name in the UI 510, a new frame 512 can be generated. In some embodiments, this new frame 512 can contain the data from the document that was named in one of the original UI frames. This functionality can allow an editor of the annotated text corpus to view a particular annotation of interest in its contextual provenance, with the annotation of interest and the source document. Edits can be made directly in the new frame 512. The changes made to the data in the new frame 512 can drive changes to the annotated text corpus, with the 512 frame changes directly incorporating into the annotated text corpus 514. Any changes to an annotated text corpus 514 can appear in the UI 510 upon a repopulation of the frame(s) of the UI 510, as by a new query, as discussed herein. These changes could result in a repopulation of a cell, a row, or a combination thereof with entirely new and different elements. This can provide a user with the ability to contemporaneously view the results of any changes to the corpus 514 via the UI 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
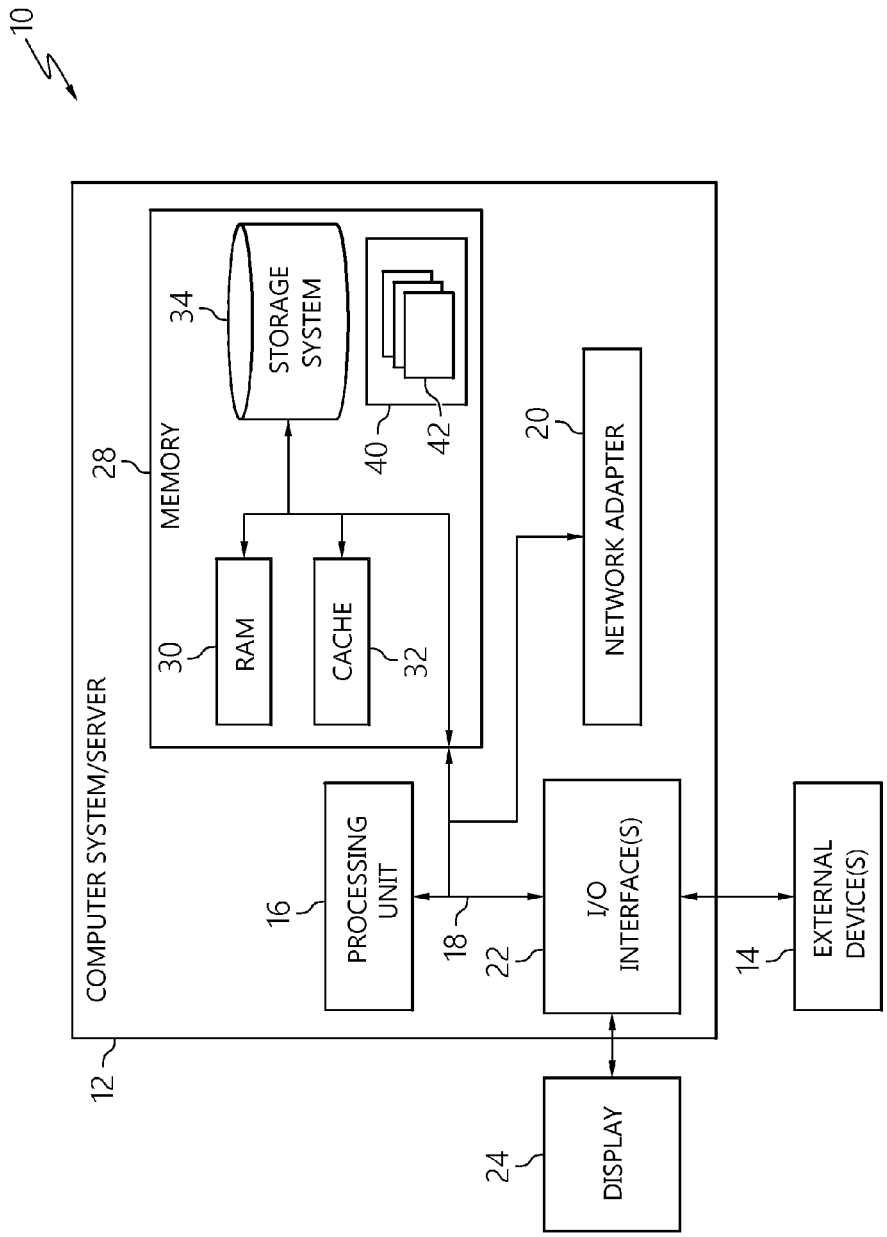
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
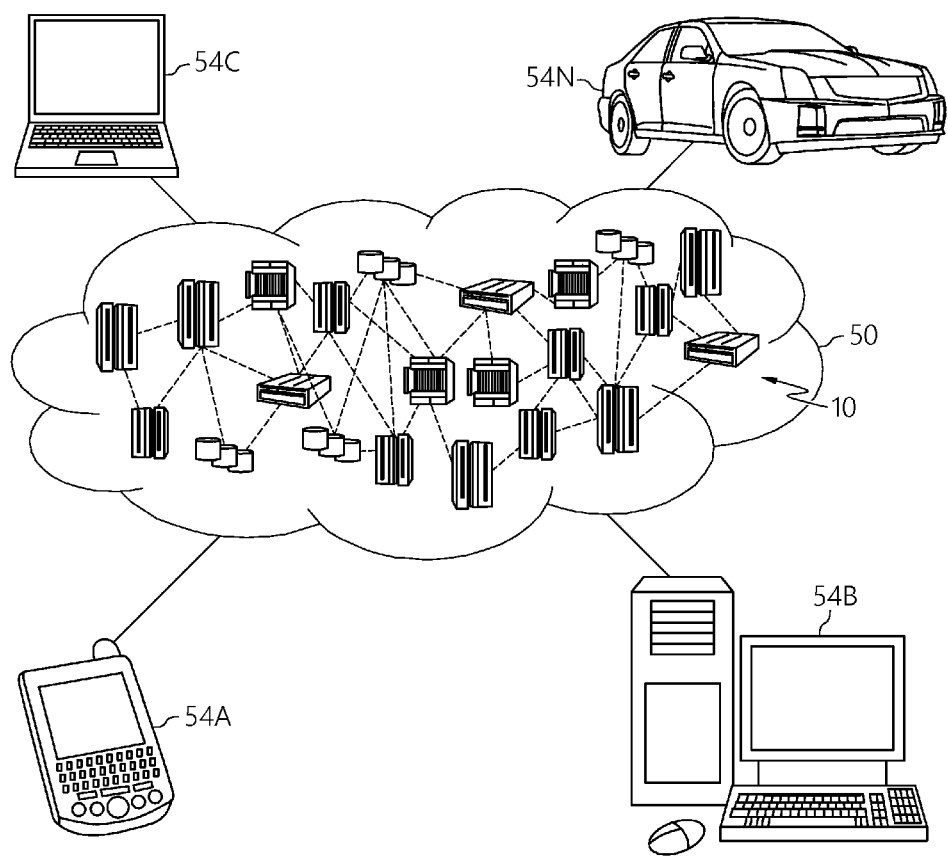
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
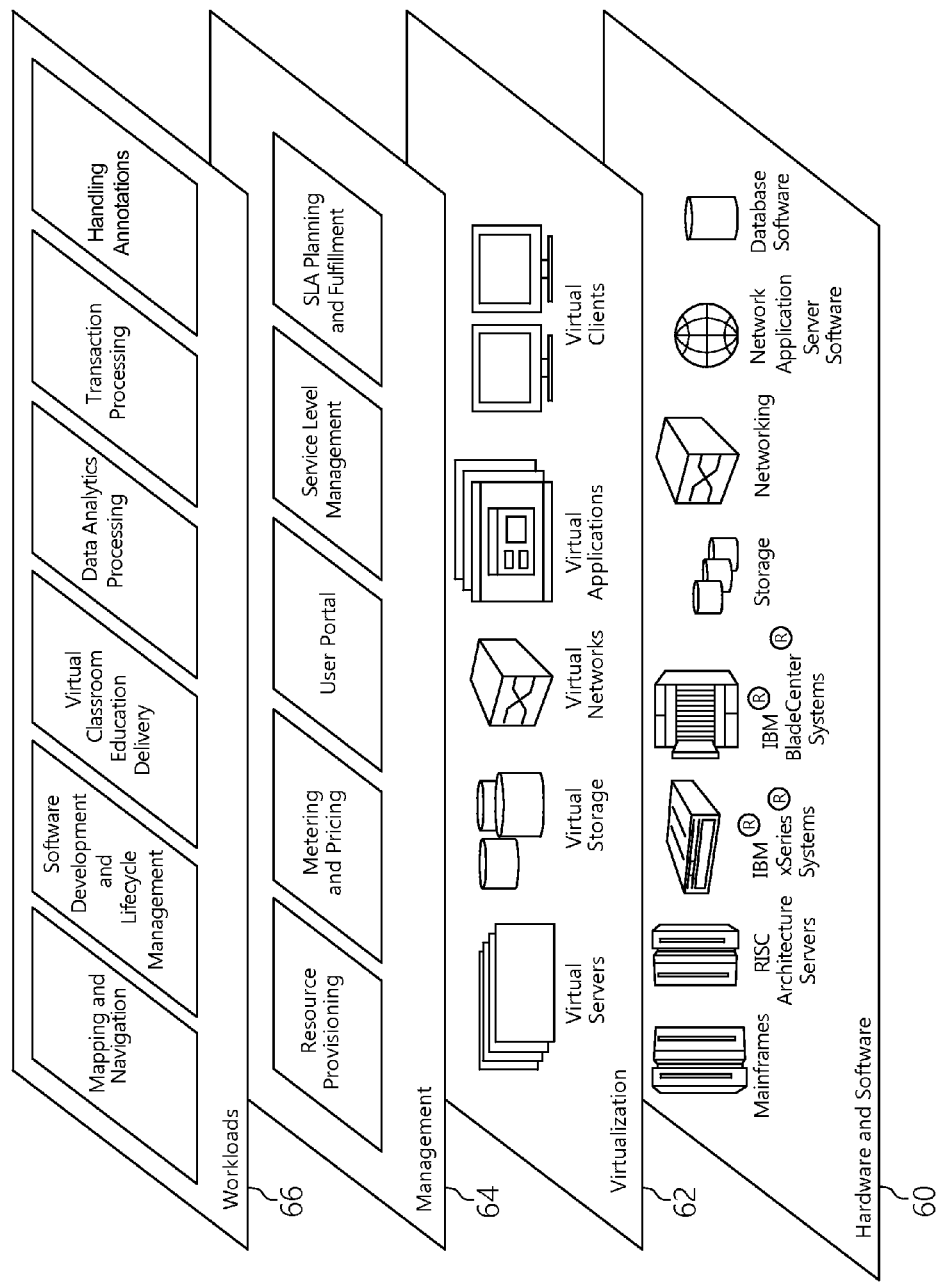
FIG. 8 depicts abstraction model layers according to an embodiment of the present invention.

Referring now to FIG. 8 a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and extracting and displaying annotations for, among other purposes, primarily editing.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system for modifying a set of annotations that include metadata describing properties of associated text fragments within an annotated text corpus, comprising:
at least one processor circuit having:
an extracting engine configured to:
receive a query specifying parameters for annotations from the set of the annotations;
extract, from the set of annotations and by the query, a first entity subset of annotations, a second entity subset of annotations, and a relations subset of annotations between the first entity subset of annotations and the second entity subset of annotations; and
extract, from the annotated text corpus, contextual information relative to the extracted annotations, wherein each annotation in the first and second entity subset of annotations serves as an anchor for each respective relations subset annotation and each piece of contextual information;
a processing engine configured to:
generate a user interface having display frames populated by frame elements that include the entity subsets of annotations, the relations subset of annotations, and the contextual information; and
receive, responsive to selections of the frame elements, input specifying modifications to the annotations;
an updating engine configured to:
modify, based on the input specifying modifications to the annotations, the set of annotations in the annotated text corpus;
and the processing engine further configured to:
receive additional input specifying a change to the particular annotation label; and
receive additional input specifying a subset of the plurality of annotations; and
the updating engine further configured to:
modify, based on the additional input, the particular annotation label for each of the annotations in the subset of the plurality of annotations having the shared particular annotation label.

2. The computer system of claim 1, wherein the set of annotations includes a plurality of annotations having a shared particular annotation label, and wherein the system comprises:
at least one computer processor circuit having:
a processing engine configured to:
receive additional input specifying a change to the particular annotation label; and
an updating engine configured to:
modify, based on the additional input, the particular annotation label for each of the annotations in the plurality of annotations having the particular annotation label.

3. The computer system of claim 1, wherein the extracting engine is configured to extract, from the set of annotations and by the query, by:
filtering, responsive to first entity parameters specified in the query, the set of annotations for the first entity subset of annotations;
filtering, responsive to second entity parameters specified in the query, the set of annotations for the second entity subset of annotations; and
filtering, responsive to parameters specified in the query, the set of annotations for the relations subset of annotations.

4. The computer system of claim 1, wherein the processing engine is further configured to generate a user interface that displays a frame that contains a particular document name in the annotated text corpus, the system comprising:
at least one computer processor circuit having:
a processing engine configured to:
receive input that specifies the particular document name in the annotated text corpus; and
generate, responsive to the input that specifies the particular document name, a frame containing data from the particular document named.

5. The computer system of claim 4 comprising:
at least one computer processor circuit having:
a processing engine configured to:
receive input from the frame containing data from the particular document; and
modify, responsive to the input from the frame containing data from the particular document, annotations of the particular document in the annotated text corpus.

6. A computer program product for modifying a set of annotations that include metadata describing properties of associated text fragments within an annotated text corpus, the computer program product comprising a computer readable storage medium having program instructions embodied therewith, wherein the computer readable storage medium is not a transitory signal per se, the program instructions executable by a computer processing circuit to cause the circuit to perform the method comprising:
receiving a query specifying parameters for annotations from the set of the annotations;
extracting, from the set of annotations and by the query, a first entity subset of annotations, a second entity subset of annotations, and a relations subset of annotations between the first entity subset of annotations and the second entity subset of annotations, wherein each annotation in the first and second entity subset of annotations serves as an anchor for each respective relations subset annotation and each piece of contextual information;
extracting, from the annotated text corpus, contextual information relative to the extracted annotations;
generating a user interface having display frames populated by frame elements that include the entity subsets of annotations, the relations subset of annotations, and the contextual information;
receiving, responsive to selections of the frame elements, input specifying modifications to the annotations;
modifying, based on the input specifying modifications to the annotations, the set of annotations in the annotated text corpus;
receiving additional input specifying a change to the particular annotation label;
receiving additional input specifying a subset of the plurality of annotations; and
modifying, based on the additional input, the particular annotation label for each of the annotations in the subset of the plurality of annotations having the shared particular annotation label.

7. The computer program product of claim 6, wherein the set of annotations includes a plurality of annotations having a shared particular annotation label, and wherein the method comprises:
   receiving additional input specifying a change to the particular annotation label; and
   modifying, based on the additional input, the particular annotation label for each of the annotations in the plurality of annotations having the particular annotation label.

8. The computer program product of claim 6, wherein the extracting, from the set of annotations and by the query, further comprises:
   filtering, responsive to first entity parameters specified in the query, the set of annotations for the first entity subset of annotations;
   filtering, responsive to second entity parameters specified in the query, the set of annotations for the second entity subset of annotations; and
   filtering, responsive to parameters specified in the query, the set of annotations for the relations subset of annotations.

9. The computer program product of claim 6, wherein the user interface includes a frame containing a particular document name in the annotated text corpus, wherein the method comprises:
   receiving input that specifies the particular document name in the annotated text corpus; and
   generating, responsive to the input that specifies the particular document name, a frame containing data from the particular document named.

10. The computer program product of claim 9, wherein the method comprises:
   receiving input from the frame containing data from the particular document; and
   modifying, responsive to the input from the frame containing data from the particular document, annotations of the particular document in the annotated text corpus.

\* \* \* \* \*